(12) United States Patent
Sato et al.

(10) Patent No.: US 9,785,244 B2
(45) Date of Patent: Oct. 10, 2017

(54) IMAGE PROJECTION APPARATUS, SYSTEM, AND IMAGE PROJECTION METHOD

(71) Applicants: Tomotoshi Sato, Kanagawa (JP); Takahiro Imamichi, Kanagawa (JP)

(72) Inventors: Tomotoshi Sato, Kanagawa (JP); Takahiro Imamichi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 244 days.

(21) Appl. No.: 14/186,180

(22) Filed: Feb. 21, 2014

(65) Prior Publication Data

US 2014/0253433 A1 Sep. 11, 2014

(30) Foreign Application Priority Data

Mar. 5, 2013 (JP) ................................ 2013-043393
Dec. 17, 2013 (JP) ................................ 2013-260604

(51) Int. Cl.
*G06F 3/01* (2006.01)
*G06F 3/00* (2006.01)
*G06F 3/03* (2006.01)

(52) U.S. Cl.
CPC .............. *G06F 3/017* (2013.01); *G06F 3/005* (2013.01); *G06F 3/0304* (2013.01)

(58) Field of Classification Search
CPC ......... G06F 3/017; G06F 3/005; G06F 3/0304
See application file for complete search history.

(56) References Cited

U.S. PATENT DOCUMENTS

| 5,220,649 A * | 6/1993 | Forcier ................ G06F 3/0488 715/273 |
| 7,375,836 B1 | 5/2008 | Sato |

(Continued)

FOREIGN PATENT DOCUMENTS

| CN | 101943947 A | 1/2011 |
| CN | 102460373 A | 5/2012 |

(Continued)

OTHER PUBLICATIONS

Combined Office Action and Search Report issued Nov. 1, 2016 in Chinese Patent Application No. 201410074706.2 (with English translation).

*Primary Examiner* — Michael Pervan
(74) *Attorney, Agent, or Firm* — Oblon, McClelland, Maier & Neustadt, L.L.P.

(57) ABSTRACT

An image projection apparatus includes a projection unit configured to project an image onto a projection target; a recognition unit configured to recognize an instruction action for the image being projected by the projection unit; a storage control unit configured to store correspondence information in which multiple instruction actions are associated with image output controls, respectively, for each type of image in a storage device; a determination unit configured to determine, on the basis of the type of the image being projected by the projection unit, correspondence information for image output control; and a projection control unit configured to perform, on the basis of the correspondence information determined by the determination unit and the instruction action recognized by the recognition unit, image projection control corresponding to the image output control that is associated with the instruction action.

18 Claims, 17 Drawing Sheets

WHEN COORDINATES OF TARGET OBJECT ARE WITHIN VIDEO AREA, DETERMINE TO VIDEO DICTIONARY INFORMATION

WHEN COORDINATES OF TARGET OBJECT IS WITHIN POWER-POINT AREA, SELECT POWER-POINT DICTIONARY INFORMATION

(56) References Cited

U.S. PATENT DOCUMENTS

| | | |
|---|---|---|
| 7,873,653 B2 | 1/2011 | Imamichi |
| 8,339,620 B2 | 12/2012 | Imamichi |
| 2003/0033395 A1 | 2/2003 | Sato |
| 2005/0007615 A1 | 1/2005 | Sato |
| 2006/0132432 A1* | 6/2006 | Bell ................. G06F 3/011 345/156 |
| 2007/0240042 A1 | 10/2007 | Sato |
| 2008/0168441 A1 | 7/2008 | Imamichi |
| 2008/0180733 A1 | 7/2008 | Imamichi |
| 2008/0282065 A1 | 11/2008 | Imamichi |
| 2009/0210859 A1 | 8/2009 | Imamichi |
| 2010/0198786 A1 | 8/2010 | Imamichi |
| 2011/0307797 A1 | 12/2011 | Imamichi et al. |
| 2012/0139827 A1 | 6/2012 | Li et al. |
| 2012/0176341 A1 | 7/2012 | Dedeoglu et al. |
| 2012/0239741 A1 | 9/2012 | Fujiwara et al. |
| 2012/0249422 A1* | 10/2012 | Tse ................. G06F 3/0304 345/158 |
| 2013/0077123 A1 | 3/2013 | Imamichi |
| 2013/0120249 A1* | 5/2013 | Im ................. G06F 3/011 345/157 |
| 2013/0132449 A1 | 5/2013 | Imamichi et al. |
| 2013/0212523 A1* | 8/2013 | Shibata ............ G06F 3/0482 715/784 |
| 2014/0168062 A1* | 6/2014 | Katz ................. G06F 3/017 345/156 |

FOREIGN PATENT DOCUMENTS

| | | |
|---|---|---|
| JP | 2003-233452 | 8/2003 |
| JP | 2014-142695 A | 8/2014 |

\* cited by examiner

INSTRUCTION AREA 4

AREA CAPTURED BY IMAGING SENSOR 100 (TARGET SPACE)

PROJECTION LIGHT

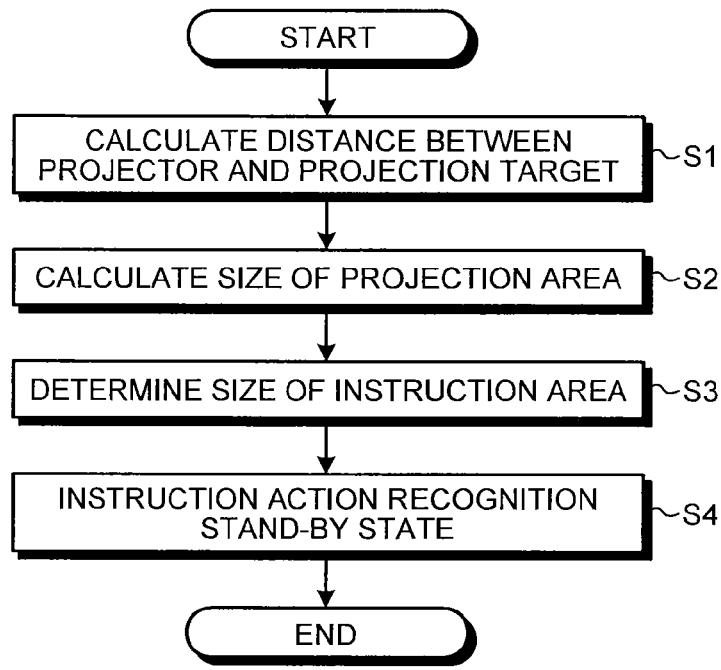
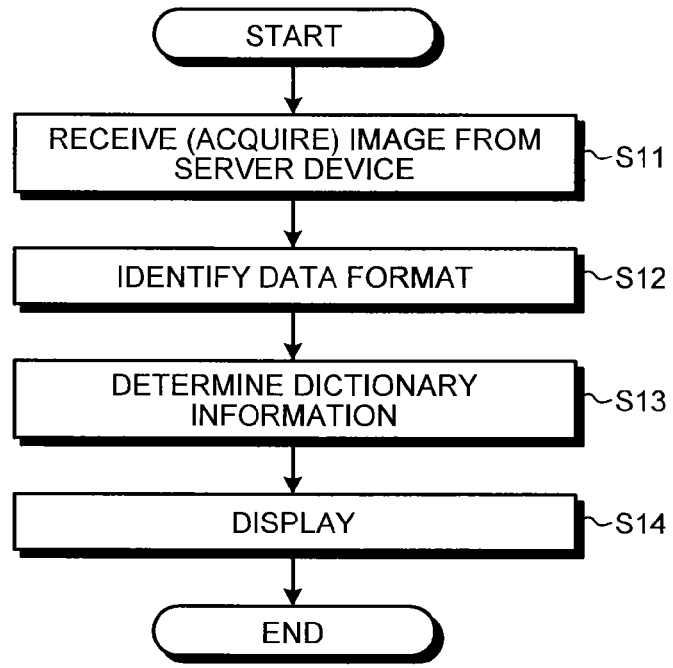

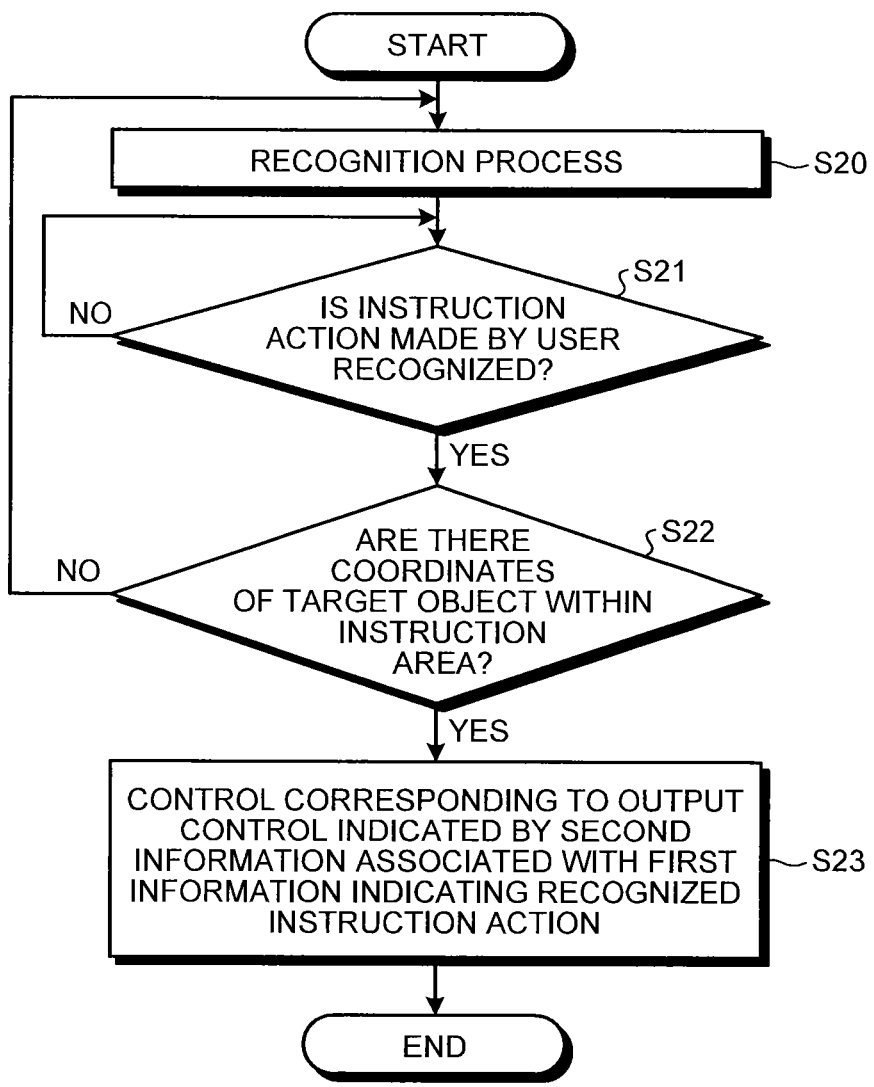

| THIRD INFORMATION | DICTIONARY INFORMATION |
|---|---|
| VIDEO | VIDEO DICTIONARY INFORMATION |
| AUDIO | AUDIO DICTIONARY INFORMATION |
| ⋮ | ⋮ |

FIG.18

| PROJECTION TARGET IMAGE 1 (DATA FORMAT: POWER POINT, SIZE: 210×297 (VERTICAL×HORIZONTAL)) ||
|---|---|
| DATA FORMAT | COORDINATES |
| VIDEO | (15, 15)-(100, 100) |
| POWER POINT | (15, 110)-(195, 282) |

| TYPE OF FILE IMAGE | FOURTH INFORMATION | DICTIONARY INFORMATION |
|---|---|---|
| PRESENTATION FILE | PAGES 1 TO 3 | PATTERN 1 DICTIONARY INFORMATION |
| PRESENTATION FILE | PAGE 4 | PATTERN 2 DICTIONARY INFORMATION |
| PRESENTATION FILE | PAGE 5 | PATTERN 3 DICTIONARY INFORMATION |
| ⋮ | ⋮ | ⋮ |

208

IMAGE PROJECTION APPARATUS, SYSTEM, AND IMAGE PROJECTION METHOD

CROSS-REFERENCE TO RELATED APPLICATIONS

The present application claims priority to and incorporates by reference the entire contents of Japanese Patent Application No. 2013-043393 filed in Japan on Mar. 5, 2013 and Japanese Patent Application No. 2013-260604 filed in Japan on Dec. 17, 2013.

BACKGROUND OF THE INVENTION

1. Field of the Invention

The present invention relates to an image projection apparatus, a system, and an image projection method.

2. Description of the Related Art

There is a known conventional technology where an image that is projected onto a projection target (e.g. a wall) by an image projection apparatus, such as a projector, is directly touched, as an instruction action, as if the image were a touch panel being touched or some instruction action (action, such as moving a hand) is made against the projected image so that a command (output control) that is allocated to the instruction action is executed (see, for example, Japanese Patent Application Laid-open No. 2003-233452).

Recent image projection apparatuses can project video images in addition to still images and thus there are few common instruction actions for still and video images. For this reason, users have to remember instruction actions according to the image types and, furthermore, because the accuracy with which instruction actions are recognized is limited, misrecognition rates increase if the number of types of instruction actions is increased. It is thus preferable that many commands can be executed with a small number of instruction actions, but heretofore there have been no systems that can do this.

Therefore, there is a need to provide an image projection apparatus, a system, and an image projection method capable of eliminating the need for the users to remember various instruction actions.

SUMMARY OF THE INVENTION

It is an object of the present invention to at least partially solve the problems in the conventional technology.

According to an embodiment, there is provided an image projection apparatus that includes a projection unit configured to project an image onto a projection target; a recognition unit configured to recognize an instruction action for the image being projected by the projection unit; a storage control unit configured to store correspondence information in which multiple instruction actions are associated with image output controls, respectively, for each type of image in a storage device; a determination unit configured to determine, on the basis of the type of the image being projected by the projection unit, correspondence information for image output control; and a projection control unit configured to perform, on the basis of the correspondence information determined by the determination unit and the instruction action recognized by the recognition unit, image projection control corresponding to the image output control that is associated with the instruction action.

According to another embodiment, there is provided a system that includes an image projection apparatus configured to project an image onto a projection target; and a server device configured to generate an image. The image projection apparatus includes a projection unit configured to project an image onto a projection target; a recognition unit configured to recognize an instruction action for the image being projected by the projection unit; a storage control unit configured to store correspondence information in which multiple instruction actions are associated with image output controls, respectively, for each type of image in a storage device; a determination unit configured to determine, on the basis of the type of the image being projected by the projection unit, correspondence information for image output control; and a projection control unit configured to perform, on the basis of the correspondence information determined by the determination unit and the instruction action recognized by the recognition unit, image projection control corresponding to the image output control that is associated with the instruction action.

According to still another embodiment, there is provided an image projection method that includes recognizing an instruction action for an image being projected onto a projection target by a projection unit; storing correspondence information in which multiple instruction actions are associated with image output controls, respectively, for each type of image in a storage device; determining, on the basis of the type of the image being projected by the projection unit, correspondence information for image output control; and performing, on the basis of the determined correspondence information and the recognized instruction action, image projection control corresponding to the image output control that is associated with the instruction action.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a flowchart of an exemplary operation of a projector from the start-up to determination of an instruction area;

FIG. 11 is a flowchart of an exemplary operation of the projector performed when the projector receives an image from the server;

FIG. 12 is a flowchart of an exemplary operation of the projector performed when an instruction area is determined and, in a state where the image received from the server device has been projected onto a projection target, a user makes an instruction action;

FIG. 15 is a diagram of exemplary information that is stored in a dictionary information storage unit according to a second embodiment;

FIG. 18 is a diagram of exemplary data structure information according to the modification;

DETAILED DESCRIPTION OF THE PREFERRED EMBODIMENTS

Embodiments of the image projection apparatus, system, image projection method, and program of the present invention will be described in detail below with reference to the accompanying drawings. Descriptions are given below taking an ultra-short-focus projector as an exemplary image projection apparatus to which the invention is applied. However, alternatively, a short-focus projector or a long-focus projector may be used as an image projection apparatus to which the invention is applied.

Here, "focus" means the same as the projection distance that denotes the distance from the projection plane to an optical position (e.g. from a projection port from which projection light is emitted to a projection object onto which an image is projected). The projection distance of an ultra-short-focus projector is shorter than the projection distance of a short-focus projector and the projection distance of a short-focus projector is shorter than the projection distance of a long-focus projector. For example, the projection distances of an ultra short-focus projector, a short-focus projector, and a long-focus-projector may be set to "11.7 cm to 24.9 cm", "0.7 m to 14.6 m", and "1.3 m to 32.4 m", respectively.

First Embodiment

Figure 1:
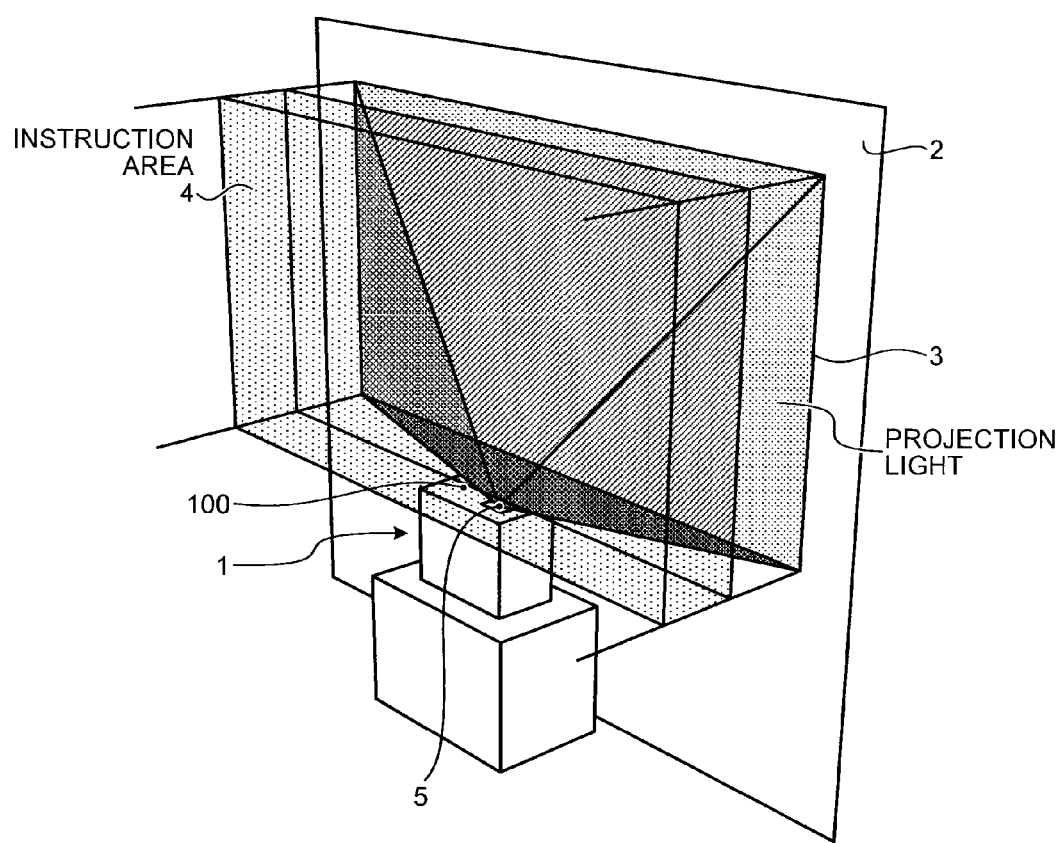
FIG. 1 is a schematic diagram describing the overview of a system according to an embodiment.
Figure 2:
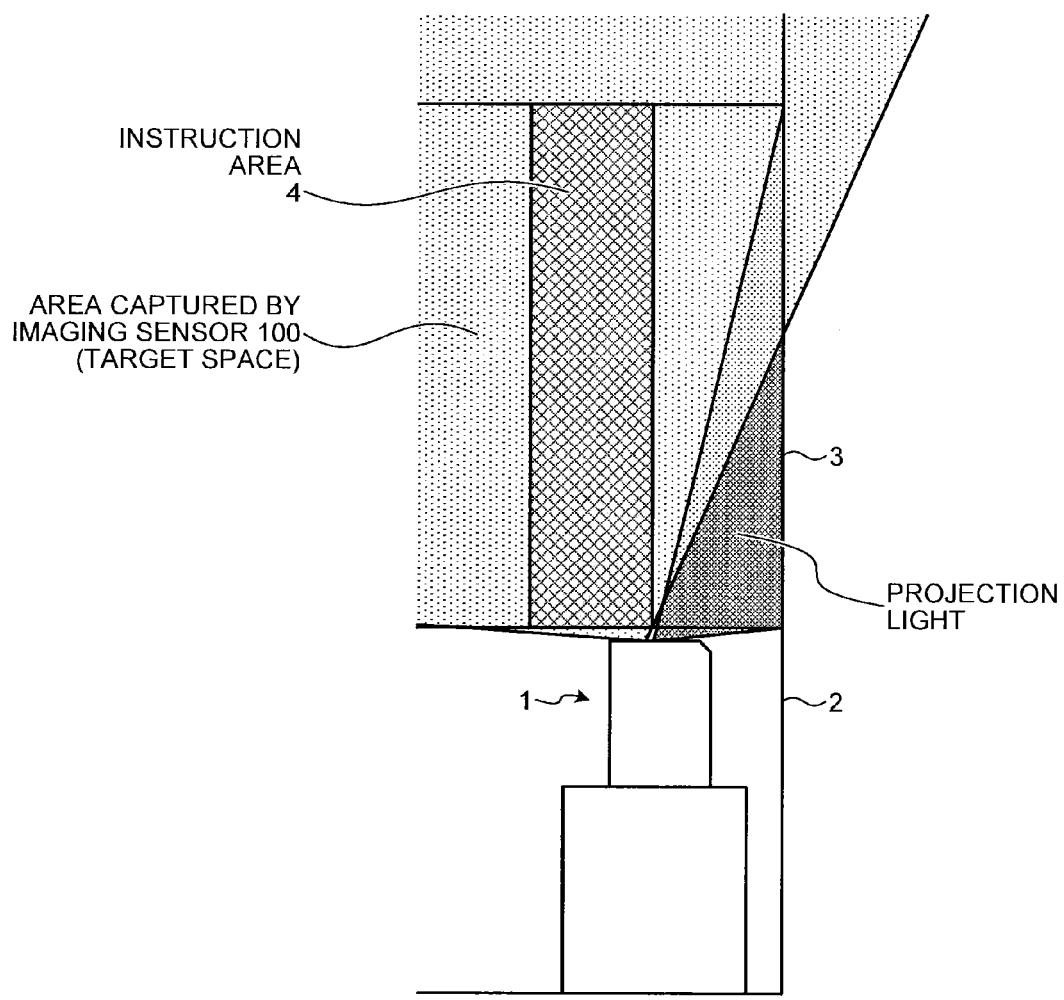
FIG. 2 is a schematic diagram of an overview of the system according to the embodiment viewed from one side.

FIG. 1 is a schematic diagram describing the overview of a system according to an embodiment. FIG. 2 is a schematic diagram of the overview of the system according to the embodiment viewed from one side. As shown in FIGS. 1 and 2, a projector 1 according to the embodiment is arranged close to a projection target (a wall in this example) 2 onto which an image is projected. An imaging sensor 100 and a projection port 5 from which projection light is emitted are provided at different positions on the top of the projector 1. The imaging sensor 100 is an apparatus that captures an image of a target space indicating a space corresponding to the image that is projected by the projector 1. In this example, the target space is a space above the projector 1 and includes at least the upper end of a projection area 3, from within the projection target 2, that indicates an area onto which an image is projected. In the embodiment, the imaging sensor 100 is configured by using a camera. Alternatively, for example, devices, such as an infrared camera or a stereo camera, may be used for the imaging sensor 100. In short, it is satisfactory if the imaging sensor 100 is a device that can capture an image of the above-described target space and can measure the distance of an object in an instruction area 4, from within the target space, that is where the user makes an instruction action.

As described below, in the embodiment, an area, from within the target space, that does not interfere with the projection light emitted from the projector 1 and that is opposed to the projection area 3 is determined as the instruction area 4 where an instruction action corresponding to the contents required to be output can be made. The size of the plane, from within the instruction area 4, that is opposed to the projection area 3 may be but is not necessarily equal to that of the projection area 3. For example, the size of the instruction area 4 may be set to vary in accordance with the contents to be displayed.

Figure 3:
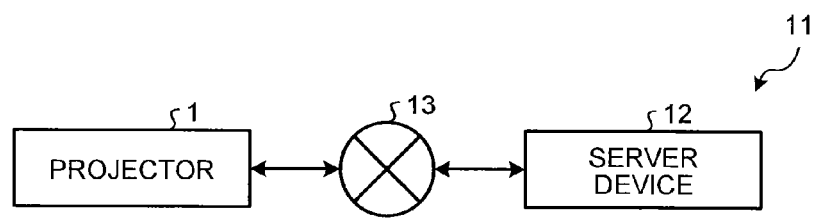
FIG. 3 is a block diagram of an exemplary configuration of the system according to the embodiment.

FIG. 3 is a diagram of an exemplary schematic configuration of a system 11 according to the embodiment. As shown in FIG. 3, the system 11 according to the embodiment includes the projector 1 and a server device 12. The projector 1 and the server device 12 can be connected to each other via a network 13, such as a LAN (Local Area Network), an intranet or the Internet. In this example, the server device 12 generates an image to be projected by the projector 1 (projection target image data) and supplies the image to the projector 1. For example, when a user makes an instruction action in the instruction area 4, the projector 1 determines the image output control in accordance with the instruction action and transmits the information indicating the determined image output control to the server device 12. The server device 12 generates an image on the basis of the information from the projector 1 and transmits the generated image to the projector 1. When the projector 1 receives the image from the server device, the projector 1 switches the image to be projected onto the projection target 2 to the received image.

Figure 4:
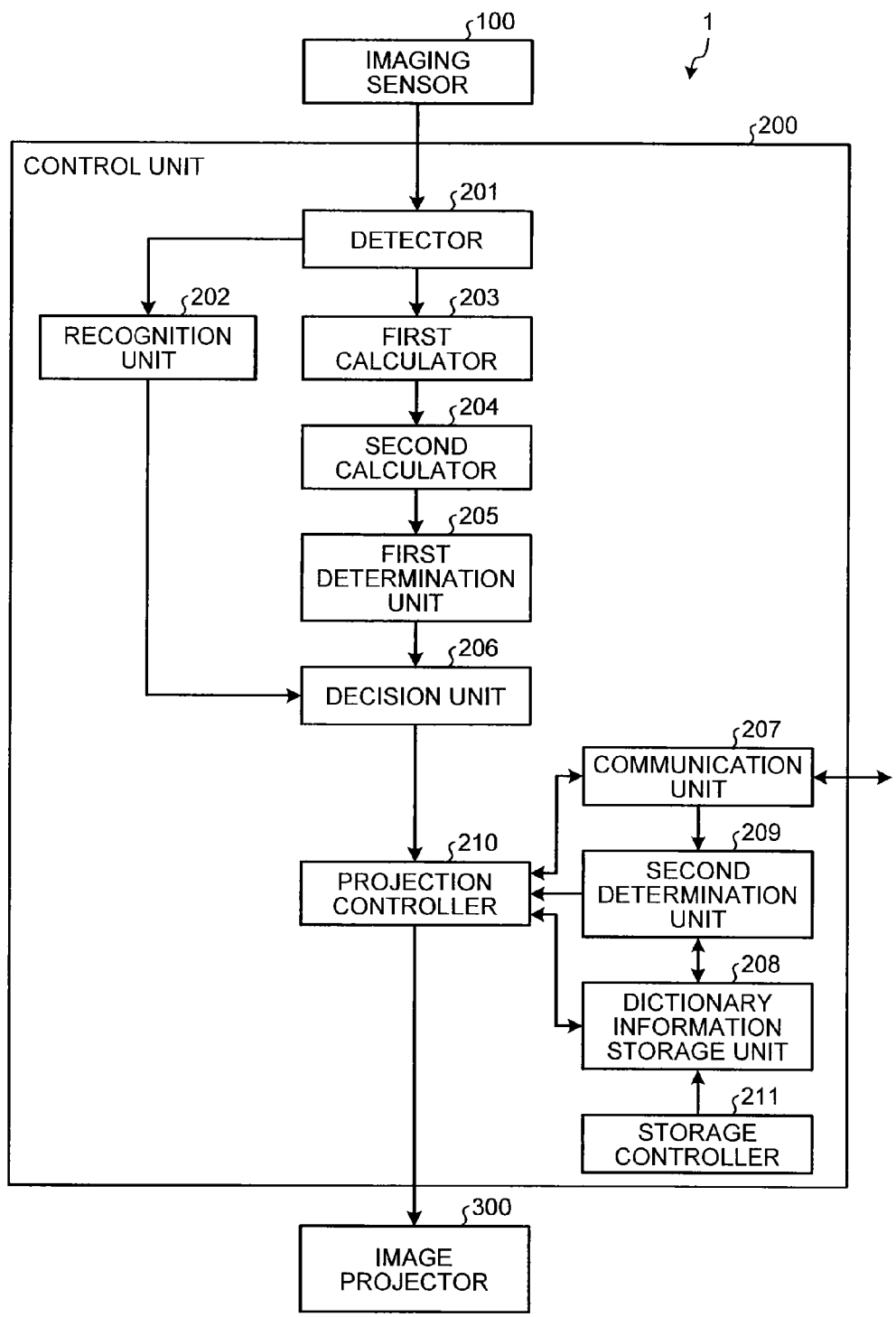
FIG. 4 is a block diagram of an exemplary functional configuration of a projector according to a first embodiment.

FIG. 4 is a block diagram of an exemplary functional configuration of the projector 1. As shown in FIG. 4, the projector 1 includes the imaging sensor 100, a control unit 200, and an image projector 300.

The control unit 200 includes a detector 201, a recognition unit 202, a first calculator 203, a second calculator 204, a first determination unit 205, a decision unit 206, a communication unit 207, a second determination unit 209, a dictionary information storage unit 208, a storage controller 211, and a projection controller 210. In this example, the hardware configuration of a normal computer device that includes a CPU, a ROM, a RAM, etc. is used for the hardware configuration of the control unit 200. The functions of each of the units of the control unit 200 (the detector 201, the recognition unit 202, the first calculator 203, the second calculator 204, the first determination unit 205, the decision unit 206, the communication unit 207, the storage controller 211, the second determination unit 209, and the projection controller 210) are implemented by executing a program that is stored in the ROM, etc. by the CPU. Alternatively, the functions of the above-described units may be implemented at least partly by using a dedicated hardware circuit. Furthermore, the dictionary information storage unit may be implemented by using the RAM, the ROM, or an auxiliary storage device, such as an HDD.

The detector 201 detects a target object (e.g. user's hand) existing in the target space. In the first embodiment, the detector 201 acquires image data that is obtained by image capturing performed by the imaging sensor 100 and then detects a target object on the basis of the acquired image data.

The recognition unit 202 recognizes an instruction action (an action, such as moving the hand) for the image projected by the image projector 300. In the first embodiment, on the basis of the detection of the target object performed by the detector 201, the recognition unit 202 recognizes the instruction action for the image projected by the image projector 300. For example, various known technologies can be used as the method of recognizing an action, such as moving a hand. The recognition unit 202 transmits information indicating the recognized instruction action to the decision unit 206 that will be described below. This information may contain the coordinates of the target object in three-dimensional space, etc.

Figure 5:
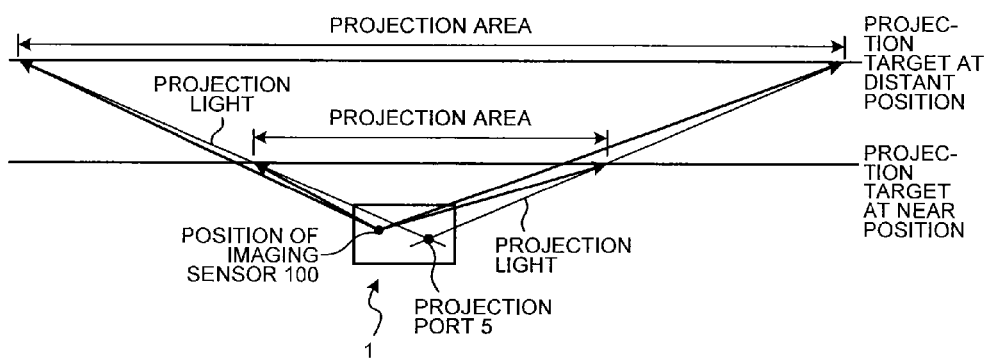
FIG. 5 is an overhead schematic view of the projector.
Figure 6:
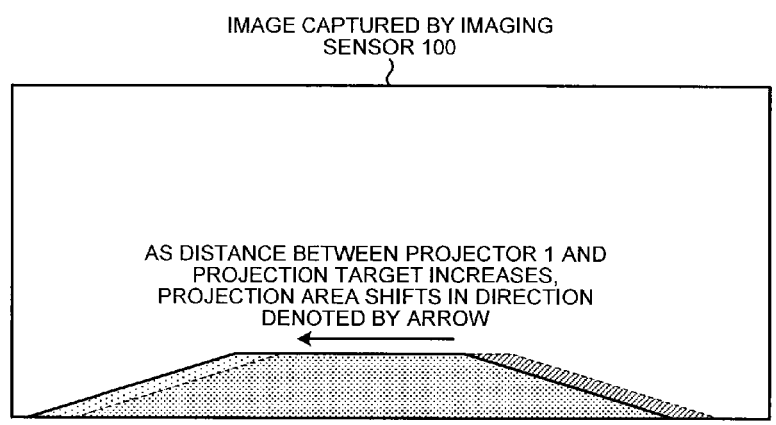
FIG. 6 is a diagram schematically showing an image captured by an imaging sensor.

The first calculator 203 calculates the distance between the projector 1 and the projection target 2 on the basis of the image data acquired by image capturing performed by the imaging sensor 100. The distance calculation method performed by the first calculator 203 will be described below. FIG. 5 is an overhead schematic view of the projector 1. In the example of FIG. 5, the projection port 5 is provided on the right side of the projector 1 and the imaging sensor 100 is provided on the left side of the projector 1. FIG. 6 is a diagram schematically showing the image data acquired by image capturing performed by the imaging sensor (a camera in this case) 100. In this embodiment, the projection port 5 and the imaging sensor 100 are provided apart from each other horizontally on the top of the projector 1. Thus, if the projector 1 is apart from the projection target 2, as shown in FIG. 6, the projection area in the image data shifts leftward in the camera's view. From the amount of shift (shift amount), the distance between the projector 1 and the projection target 2 can be calculated. It can be also understood that the first calculator 203 calculates the distance between the projector 1 and the projection target 2 in accordance with the position of the projection area in the image data acquired by the image capturing performed by the imaging sensor 100.

Figure 7:
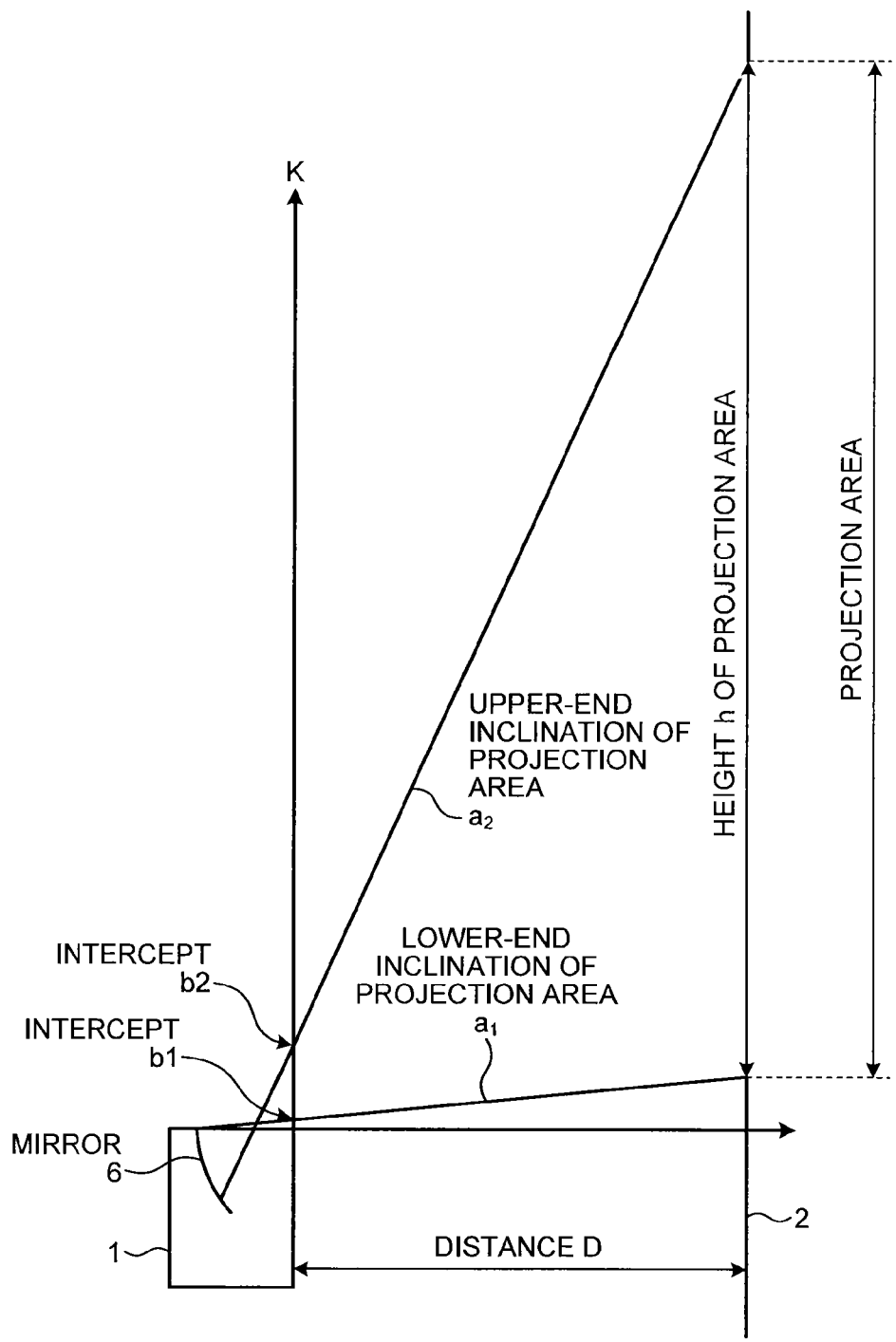
FIG. 7 is a diagram describing a method of calculating the size of a projection area.

The descriptions here will be continued by referring back to FIG. 4. The second calculator 204 calculates the size of the projection area on the basis of the distance calculated by the first calculator 203. The projection area size calculation method performed by the second calculator 204 will be described below. FIG. 7 is a diagram describing the method of calculating the size of a projection area. FIG. 7 is a schematic diagram of the projector 1 viewed from one side. As is understood from FIG. 7, the height h of the projection area can be represented by the following Equation (1):

$$h = D \times (a2 \times a1) + b2 \times b1 \quad (1)$$

where D denotes the distance between the projector 1 and the projection target 2; a2 denotes the angle of projection light incident on the upper end of the projection area; a1 denotes the angle of projection light incident on the lower end of the projection area; b1 denotes the intercept corresponding to the intersection between the line K extending upward in parallel with the projection target 2 from the end face of the projector 1 of the projection target 2 on the side of the projection target 2 and the line indicating the projection light from the projection port 5 and incident on the lower end of the projection area; b2 denotes the intercept corresponding to the intersection between the line K shown in FIG. 7 and the line indicating the projection light from the projection port 5 and incident on the upper end of the projection area. The values of a1, a2, b1 and b2 are previously determined according to the properties of a mirror 6 used in the projector 1.

The width of the projection area can be calculated from the screen aspect ratio. As described above, the second calculator 204 calculates the height and width of the projection area, thereby calculating the size of the projection area (=height×width).

Descriptions will be continued here by referring back to FIG. 4. The first determination unit 205 determines, as an instruction area where an instruction action corresponding to the contents required to be output can be made, an area, from within the target space, that does not interfere with the projection light from the projector 1, and that is opposed to the projection area. In the first embodiment, as shown in FIGS. 1 and 2, the first determination unit 205 determines, as the instruction area 4, a cuboid area that occupies a certain area in the normal direction of the projection target 2, which is a cuboid area above the projector 1 and that does not interfere with the projection light and is opposed to the projection area 3. However, the shape of the instruction area 4 is not limited to this and it can be arbitrarily changed. In order for the user to know the approximate position of the instruction area, for example, the top or bottom surface of the projector 1 may be marked (it is satisfactory if the information can signify the approximate position of the instruction area).

The decision unit 206 decides whether the instruction action recognized by the recognition unit 202 is made in the instruction area 4 determined by the first determination unit 205. When the decision unit 206 decides that the instruction action recognized by the recognition unit 202 has been made in the instruction area 4 determined by the first determination unit 205, the decision unit 206 outputs information indicating the instruction action to the projection controller 210.

The communication unit 207 has a function of communicating with the server device 12. In the first embodiment, the communication unit 207 has a function of transmitting, under the control of the projection controller 210, information indicating image output control to the server device 12. The communication unit 207 also has a function of receiving an image (projection target image data) transmitted from the server device 12.

Figure 8:
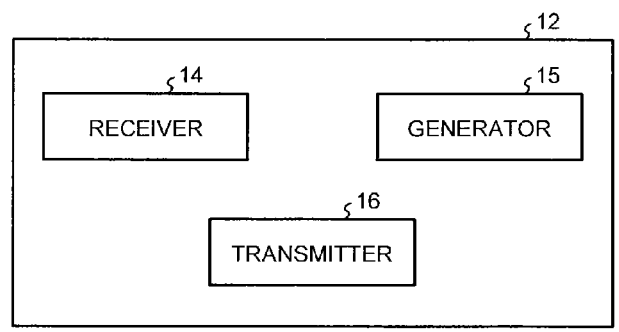
FIG. 8 is a block diagram of an exemplary functional configuration of a server device.

The functions of the server device 12 will be described here with reference to FIG. 8. FIG. 8 is a diagram of an exemplary functional configuration of the server device 12. As shown in FIG. 8, the server device 12 includes a receiver 14, a generator 15, and a transmitter 16.

The receiver 14 receives information indicating image output control (second information that will be described below) from the projector 1. The generator 15 generates an image to be projected (projection target image) on the basis of the information (second information) received by the receiver 14. The transmitter 16 transmits the image (image data) generated by the generator 15 to the projector 1. In this example, the hardware configuration of a normal computer device that includes a CPU, a ROM, a RAM, etc. is used for the hardware configuration of the server device 12. The functions of each of the units (the receiver 14, the generator 15, and the transmitter 16) of the server device 12 are implemented by executing a program that is stored in a ROM, etc. by the CPU. Alternatively, at least some of the functions of the above-described units may be implemented by using a dedicated hardware circuit.

Descriptions will be continued here by referring back to FIG. 4. The storage controller 211 stores correspondence information (hereinafter, "dictionary information" as appropriate), where multiple instruction actions are each associated with image output control corresponding to the instruction action, in the dictionary information storage unit 208 according to each image type. In the first embodiment, the dictionary information storage unit 208 previously registers dictionary information, where multiple pieces of first information each indicating an instruction action are associated respectively with multiple pieces of second information each indicating image output control, in association with third information indicating the image type. In this example, the third information contains information indicating the type of application that is used to generate document data (e.g. document generation applications such as PowerPoint (a product of Microsoft Corporation), PDF, and WORD (a product of Microsoft Corporation)), information indicating the video data format, and information indicating the audio data format, etc. In other words, in this example, the third information can be considered as information indicating the data format.

Figure 9:
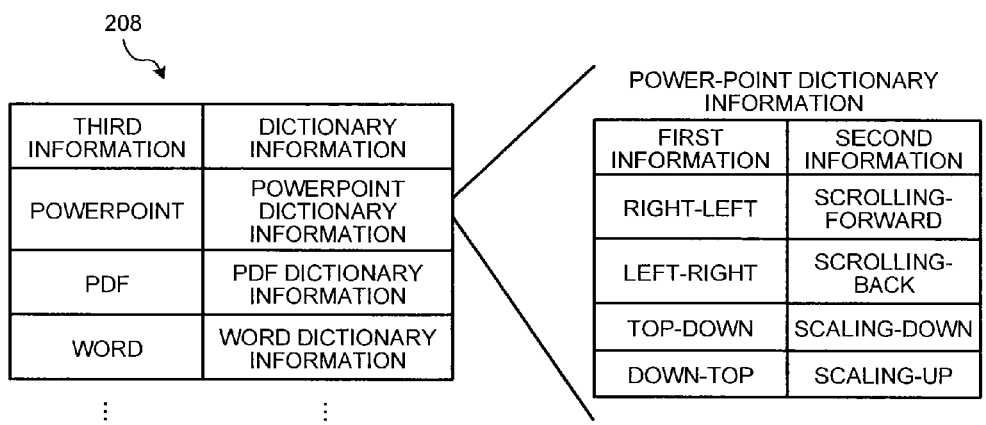
FIG. 9 is a diagram of exemplary information that is stored in a dictionary information storage unit according to the first embodiment.

In the example of FIG. 9, the dictionary information storage unit 208 stores third information indicating PowerPoint in association with PowerPoint dictionary information. The dictionary information storage unit 208 also stores third information indicating PDF in association with PDF dictionary information. Furthermore, the dictionary information storage unit 208 stores third information indicating WORD in association with WORD dictionary information.

The PowerPoint dictionary information illustrated in FIG. 9 contains four combinations of first information and second information. The combination in the first row is an association (tying) between first information indicating an instruction action of moving a target object from right to left (e.g. first information indicating a flick to the left) and second information indicating scrolling forward to the next page. The combination in the second row is an association between first information indicating an instruction action of moving a target object from left to right (e.g. first information indicating a flick to the right) and second information indicating scrolling back to the previous page. The combination in the third row is an association between first information indicating an instruction action of the top-down moving of a target object and second information indicating scaling-down of the currently-projected page. The combination in the fourth row is an association between first information indicating an instruction action of the down-top moving of a target object and second information indicating scaling-up of the currently-projected page. The content of PowerPoint dictionary information is not limited to this and it can be changed arbitrarily.

In the first embodiment, between two or more pieces of association information (dictionary information), output control (second information) that is associated with a common instruction action (first information) differs according to the correspondence information. For example, while each of the PowerPoint dictionary information and PDF dictionary information contains first information indicating an instruction action of moving a target object from right to left, the second information associated with the first information differs between the PowerPoint dictionary information and the PDF dictionary information. For example, while the first information indicating the instruction action of moving a target object from right to left is associated with second information indicating scrolling forward to the next page in the PowerPoint dictionary information, first information indicating the instruction action of moving a target object from right to left may be associated with second information indicating rotating of the currently-projected page clockwise by only 90 degrees in the PDF dictionary information. In this manner, multiple types of output control (command in another respect) can be set for a certain instruction action.

Descriptions will be continued here by referring back to FIG. 4. On the basis of the type of the image that is projected onto the projection target 2, the second determination unit 209 determines correspondence information (dictionary information) for controlling image output. In the first embodiment, when the communication unit 207 receives an image that is generated by the server device 12, the second determination unit 209 determines the data format of the received image. In this example, the second determination unit 209 has a function of determining the data format of the image received from the server device 12. Alternatively, for example, the projector 1 (the communication unit 207) may receive, in addition to the projection target image, information indicating the data format of the image from the server device 12. The second determination unit 209 determines, as dictionary information for image output control, dictionary information corresponding to third information indicating the data format of the received image from among the multiple types of dictionary information stored in the dictionary information storage unit 208. The second determination unit 209 notifies the projection controller 210 of the determined dictionary information.

On the basis of the correspondence information (dictionary information) determined by the second determination unit 209 and the instruction action recognized by the recognition unit 202, the projection controller 210 performs image projection control corresponding to the output control that is associated with the instruction action. In the first embodiment, the projection controller 210 performs control (image projection control) corresponding to the output control that is indicated by the second information associated with first information indicating the instruction action recognized by the recognition unit 202 (in this example, the instruction action indicated by the information output from the decision unit 206). For example, when the dictionary information determined by the second determination unit 209 is PowerPoint dictionary information and the instruction action recognized by the recognition unit 202 is instruction information for moving a target object from right to left (e.g. flick to the left), the projection controller 210 controls the identifying of, from within the PowerPoint dictionary information, the second information (in the example of FIG. 9, second information indicating scrolling forward to the next page) associated with the first information indicating moving of a target object from right to left and controls the transmitting of the identified second information to the server device 12 via the communication unit 207.

Each time the communication unit 207 receives an image generated by the server device 12, the projection controller 210 controls the switching of the image to be projected onto the projection target 2 to the received image. Specifically, each time the communication unit 207 receives an image generated by the server device 12, the projection controller 210 supplies the received image to the image projector 300. The image projector 300 projects the image supplied from the projection controller 210 onto the projection target 2. Accordingly, each time a new image is transmitted from the server device 12, the image to be projected onto the projection target 2 is switched to the new image. In the first embodiment, the server device 12 generates an image according to second information. Alternatively, for example, the projector 1 (e.g. the projection controller 210) may generate an image according to the identified second information.

An exemplary operation of the projector 1 from the start-up to determination of the instruction area 4 will be described below. FIG. 10 is a flowchart of an exemplary operation of the projector 1 from the start-up to the determination of the instruction area 4. As shown in FIG. 10, first, the first calculator 203 calculates the distance between the projector 1 and the projection target 2 on the basis of image data acquired by the detector 201 (step S1). The second calculator 204 then calculates the size of the projection area on the basis of the distance calculated at step S1 (step S2). The first determination unit 205 determines the size of the instruction area on the basis of the size of the projection area calculated at step S2 (step S3) and then determines the instruction area. The recognition unit 202 stands by in an instruction action recognition stand-by state until the power is turned off or a gesture function is turned off (step S4). As described above, because the size of the projection area varies according to the distance between the projector 1 and the projection target 2, the instruction area 4 also varies according to the distance between the projector 1 and the projection target 2. For example, in the configuration where a sensor that detects movement of the projector 1 is installed in the projector 1, when the sensor detects movement of the projector 1, the processes at steps S1 to S3 may be performed again.

An exemplary operation of the projector 1 performed when it receives an image from the server device 12 will be described here. FIG. 11 is a flowchart of an exemplary operation of the projector 1 in such a case. First, the communication unit 207 receives (acquires) an image from the server device 12 (step S11). The second determination unit 209 then determines the data format of the image received at step S11 (step S12). The second determination unit 209 then determines, as dictionary information for image output control, dictionary information corresponding to third information indicating the data format that is determined at step S12 (step S13). AS described above, the second determination unit 209 notifies the projection controller 210 of the determined dictionary information. The projection controller 210 controls the projecting and displaying of the image received at step S11 onto the projection target 2 (step S14). As described above, in this example, each time the communication unit 207 receives an image generated by the server device 12, the projection controller 210 controls the switching of the image to be projected onto the projection target 2 to the received image. The order of steps S12 to S14 may be changed arbitrarily.

An exemplary operation of the projector 1 performed when the user makes an instruction action in a state where the instruction area 4 has been determined and the image received from the server device 12 is projected onto the projection target 2 will be described below. FIG. 12 is a flowchart of an exemplary operation of the projector 1 in this case. As shown in FIG. 12, the recognition unit 202 performs a process to recognize the instruction action made by the user (step S20). In the first embodiment, in the instruction action recognition stand-by state, the target object is imaged in the image data captured by the camera and thus, when the detector 201 detects the target object, the recognition unit 202 recognizes the instruction action made by the user. In other words, the recognition process performed by the recognition unit 202 is performed each time the detector 201 detects a target object. When the recognition unit 202 recognizes the instruction action made by the user (YES at step S21), the decision unit 206 decides whether the coordinates of the target object are within the instruction area 4 determined by the first determination unit 205 on the basis of the information from the recognition unit 202 (step S22). It can be also considered that the decision unit 206 decides whether the instruction action recognized by the recognition unit 202 has been made within the instruction area 4.

Figure 13:
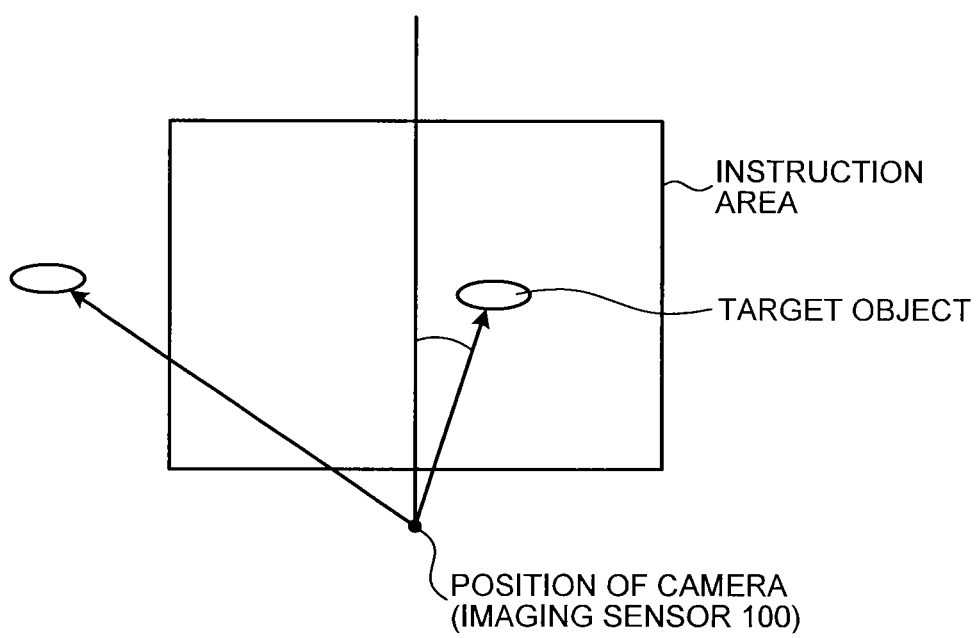
FIG. 13 is a diagram describing a method of determining whether there is a target object within an instruction area.

FIG. 13 is a diagram describing a method of determining whether there is a target object in the instruction area 4. The camera (the imaging sensor 100) can measure the position (angle) of the target object vertically above the camera and the distance to the target object. If these two are known, from the position of the projection area calculated by the second calculator 204 and the depth of the instruction area 4 determined by the first determination unit 205 (the size of the projection target 2 in the normal direction), it can be determined whether the target object is in the instruction area 4. In this example, the position (angle) of the target object vertically above the camera and the information indicating the distance to the target object are contained in the information from the recognition unit 202. The decision unit 206 receives information indicating the position of the projection area from the second calculator 204 and receives the information indicating the depth of the instruction area 4 from the first determination unit 205. On the basis of such information, the decision unit 206 can then decide whether there is a target object in the instruction area 4.

Descriptions will be continued here by referring back to FIG. 12. At step S22, when it is decided that the coordinates of the target object are not within the instruction area 4 determined by the first determination unit 205 (NO at step S22), the processing returns to step S20. In contrast, when it is decided that the coordinates of the target object are within the instruction area 4 determined by the first determination unit 205 (YES at step S22), the projection controller 210 reads the dictionary information (the latest dictionary information notified by the second determination unit 209) from the dictionary information storage unit 208 (alternatively, for example, the dictionary information may be received from the second determination unit 209) and performs control corresponding to the output control indicated by the second information, from among the multiple pieces of second information contained in the read dictionary information, that is associated with the first information indicating the instruction action recognized at step S21 (step S23).

Figure 14:
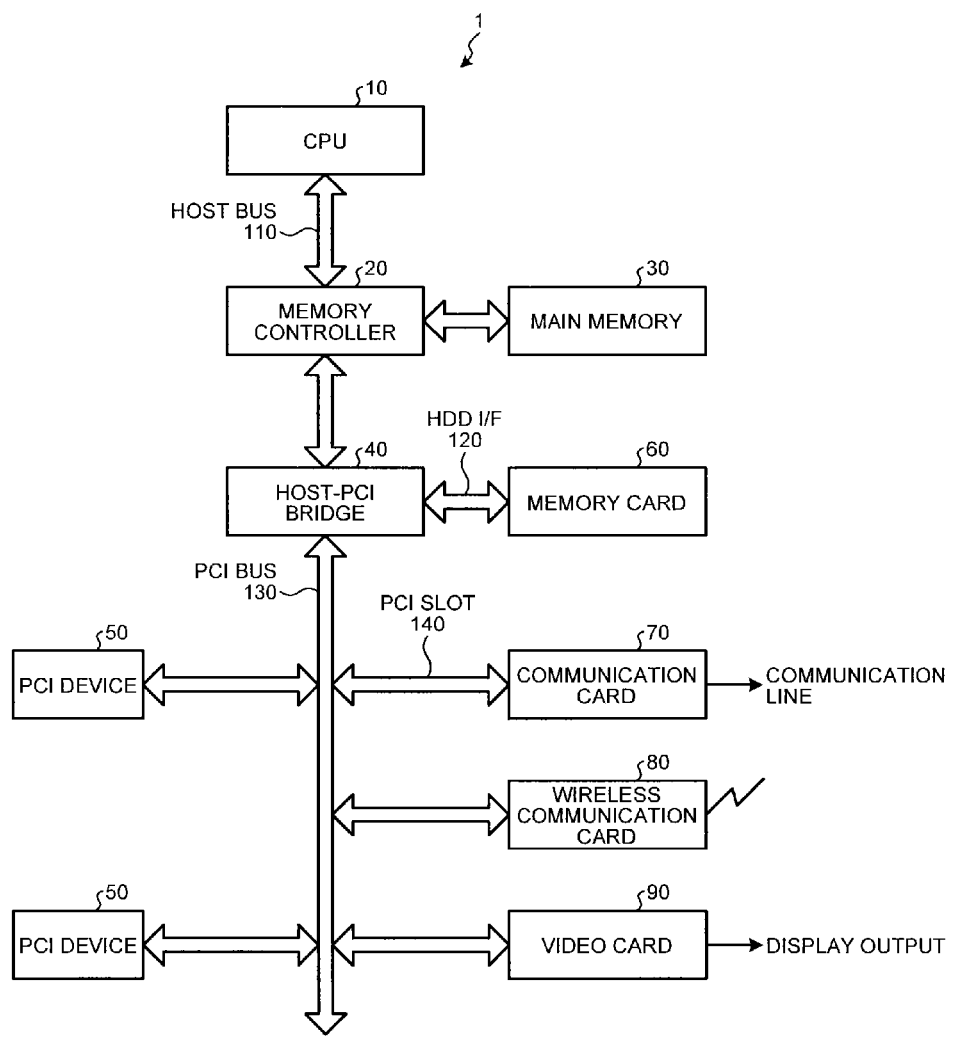
FIG. 14 is a diagram of an exemplary hardware configuration of a projector according to an embodiment.

An exemplary hardware configuration of the projector 1 according to the embodiment will be described below. FIG. 14 is a block diagram of an exemplary hardware configuration of the projector 1. As shown in FIG. 14, the projector 1 includes a CPU 10, a memory controller 20, a main memory 30, and a host-PCI bridge 40. The memory controller 20 is connected to the CPU 10, the main memory 30, and the host-PCI bridge 40 via a host-bus 110.

The CPU 10 performs general control of the projector 1. The memory controller 20 controls reading/writing with respect to the main memory 30. The main memory 30 is a system memory that is used as a memory for storing programs and data, a memory for loading programs and data, a memory for storing drawings, etc.

The host-PCI bridge 40 is a bridge for connecting peripheral devices with the PCI (Peripheral Component Interconnect) device 50. The host-PCI bridge 40 is connected to a memory card 60 via a HDD I/F 120. The host-PCI bridge 40 is connected to the PCI device 50 and the PCI bus 130. The host-PCI bridge 40 is connected to a communication card 70, a wireless communication card 80, a video card 90, etc. via a PCI bus 130 and a PCI slot 140.

The memory card 60 is used as a device to boot the OS. The communication card 70 and the wireless communication card 80 are used to connect to a network, such as a LAN, or a communication line. The video card 90 is used to project images and output video signals to a display output. The control program executed by the projector 1 according to the first embodiment is provided by being previously installed in the storage memory of the main memory 30, etc.

As described above, the dictionary information storage unit 208 of the first embodiment previously registers multiple types of dictionary information in association with multiple pieces of third information each indicating a data format. In the multiple types of dictionary information, multiple pieces of first information each indicating an instruction action are associated respectively with multiple pieces of second information each indicating image output control. Upon receiving an image that is generated by the server device 12 (projection target image data), the projector 1 of the first embodiment determines, as dictionary information for image output control, the dictionary information corresponding to the third information indicating the data format of the received image. In the first embodiment, because second information associated with common first information in two or more pieces of dictionary information differs according to each piece of dictionary information, multiple types of output control (command from a different view) can be set for an instruction action. Accordingly, the first embodiment leads to beneficial effects in that many commands can be executed with a small number of instruction actions.

Furthermore, in the first embodiment, because an area, from within the target space indicating the space above the projector 1, that does not interfere with the projection light from the projector 1 and that is opposed to the projection area is determined as an instruction area where an instruction action corresponding to the contents required to be output can be made, the shadow of an operator is not imaged in the projected image and, in addition, because the operator makes an instruction action within the area that is opposed to the image projected onto the projection target, the operator can intuitively understand the correspondence between his/her operation and the projected image. Accordingly, the first embodiment leads to unique effects in that the visibility of the projected image can be ensured and an intuitive and simple operation can be provided.

Here, as a comparative example of the first embodiment, a configuration is assumed where an image of a projection area is captured by using an imaging sensor, such as a camera, to detect a user's action and the projection area is used as a touch panel (the configuration disclosed in Japanese Patent Application Laid-open No. 2003-233452). If a camera with, for example, a horizontal angle of view of 60° and a vertical angle of view of 50° is used as an imaging sensor for capturing an image of the projection area and the horizontal distance from a vertical operation plane to the camera is 85 cm, the following equation is satisfied: the horizontal width of the virtual operation plane×vertical width=100 cm×100 cm. This size covers the projection screen size (100 cm×60 cm for 48-inch) and thus an inexpensive camera can be used. However, for an ultra-short-focus projector, for example, the projection distance is "11.7 cm to 24.9 cm" as described above and accordingly the distance between the camera installed in the ultra-short-focus projector and the virtual operation plane (that can be regarded as a projection area in the comparative example) is significantly reduced compared to the above case; therefore, the size of the virtual operation plane captured by the camera cannot be within the area of the projection screen. For this reason, when the technology of the comparative example is applied to a projector, such as an ultra-short-focus projector, with a projection distance lower than a reference value (e.g. 85 cm), it is necessary to use a camera with a larger angle of view (viewing angle), which leads to a cost increase.

In contrast, in the first embodiment, the function required of the imaging sensor 100 installed in the projector 1 is merely capturing of an image of an instruction area indicating an area, from within a target space indicating the space above the projector 1, that does not interfere with the projection light from the projector 1 and that is opposed to the projection area (i.e., it is not required to capture an image of the whole projection area, which is required for the comparative example). For this reason, even for an ultra-short-focus projector, the above-described unique effect can be implemented in addition to an advantage that an inexpensive camera can be used for the imaging sensor 100 installed in the projector. Accordingly, the present invention is particularly effective when, for example, applied to a projector with a projection distance less than a given reference value, such as an ultra-short-focus projector. Alternatively, the present invention can be also applied to a projector with a projection distance equal to or more than a given reference value and, needless to say, even in such a case, the above-described unique effects can be implemented.

The method of determining the target space and the instruction area 4 is not limited to the contents of the above-described embodiments and is arbitrary.

Second Embodiment

A second embodiment will be described below. The method of determining dictionary information in the second embodiment is different from that of the first embodiment. This will be described in detail below. Descriptions for parts common with those of the first embodiment will be omitted as and when appropriate.

As described above, the third information contains information indicating the type of the application that is used to generate data (e.g. a document generation application, such as PowerPoint, PDF, or WORD), information indicating the video data format, and information indicating the audio data format, etc. FIG. 15 is a diagram of exemplary information that is stored in a dictionary information storage unit 208 according to the second embodiment. In the example of FIG. 15, in addition to the information illustrated in FIG. 9, the dictionary information storage unit 208 stores third information indicating a video data format in association with video dictionary information and stores third information indicating an audio data format in association with audio dictionary information. The video dictionary information and audio dictionary information are different types of dictionary information from document dictionary information (e.g. dictionary information of PowerPoint, PDF dictionary information, and dictionary information of WORD).

Furthermore, as in the case of the first embodiment, for example, regarding document dictionary information, video information, and audio dictionary information, the second information associated with common first information is set different according to each type of dictionary information.

Figure 16:
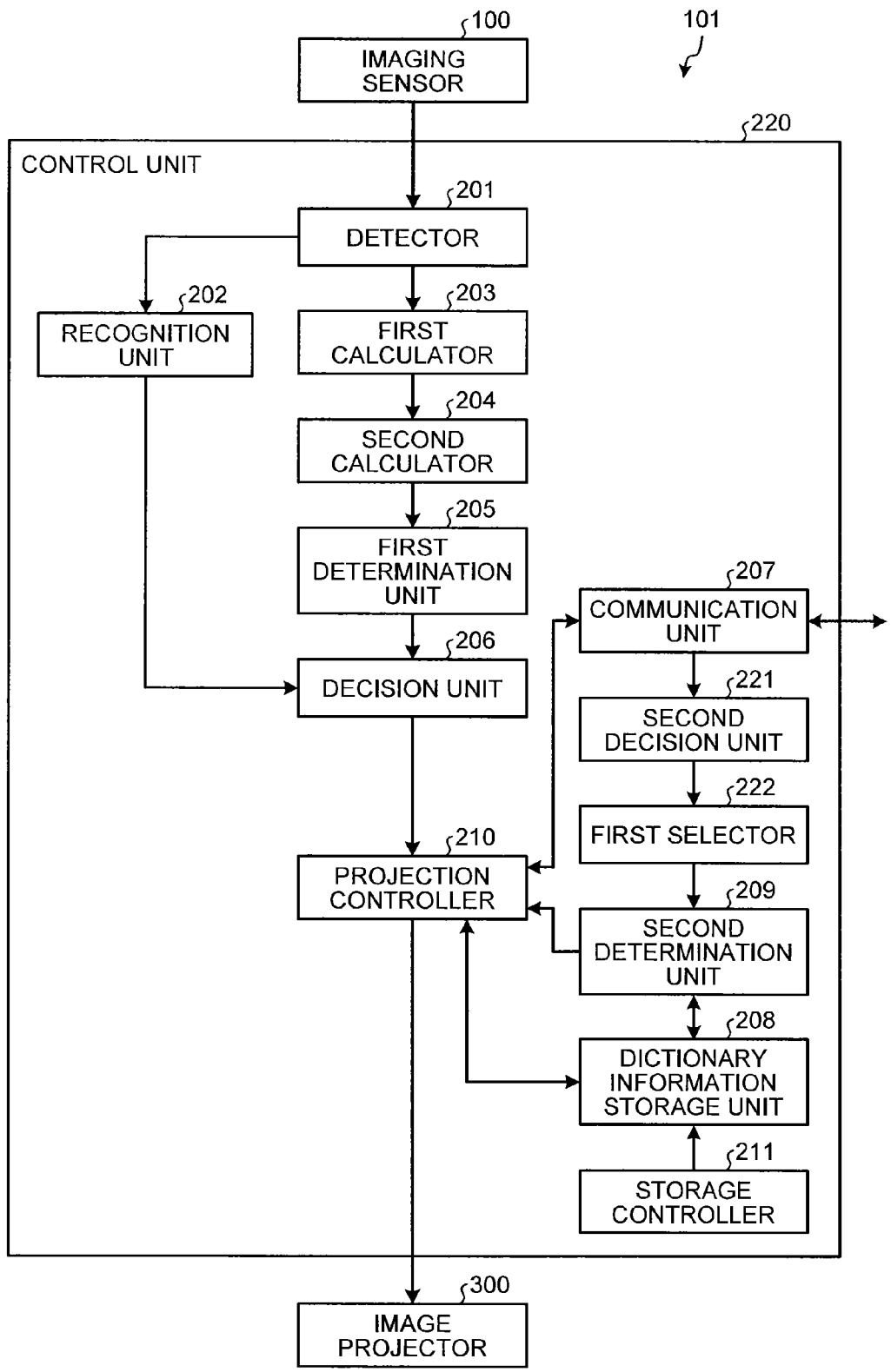
FIG. 16 is a block diagram of an exemplary functional configuration of a projector according to the second embodiment.

FIG. 16 is a block diagram of an exemplary configuration of a projector 101 according to the second embodiment. As shown in FIG. 16, the projector 101 includes the imaging sensor 100, a control unit 220, and the image projector 300. The control unit 220 has a different function from that of the control unit of the first embodiment.

As shown in FIG. 16, the control unit 220 is different from the control unit of the first embodiment in that the control unit 220 further includes a second decision unit 221 and a first selector 222. The second decision unit 221 has a function of, when the communication unit 207 receives an image that is generated by the server device 12, determining the data format of the received image and determining whether the received image contains data in a data format different from the identified data format. For example, when the data format of the image received from the server device 12 is PowerPoint, the second decision unit 221 decides whether the image contains data in a data format different from PowerPoint (e.g. WORD data, video data, or audio data).

For example, when the second decision unit 221 decides that the image (projection target image) received from the server device 12 contains data in a data format different from the data format of the image, the first selector 222 selects any one data format in response to a user's input. The method used by the user to select a desired data format is arbitrary.

For example, an image received from the server device 12 may contain, for multiple data formats, UI images indicating operation buttons for selecting a data format such that the user can make an instruction action of holding out a hand (finger) to a UI image corresponding to a desired data format so as to select the data format corresponding to the UI image. In this case, for example, the server device 12 can transmit, to the projector 1, the image generated by the generator 15 and UI information indicating the position of each UI image contained in the image. On the basis of the instruction action recognized by the recognition unit 202 and the UI information received from the server device 12, the first selector 222 determines which UI image is indicated by the instruction action made by the user. On the basis of the result of the judgment, the first selector 222 can select a data format corresponding to the UI image indicated by the user.

The second determination unit 209 determines, as dictionary information for performing image output control, dictionary information corresponding to the third information indicating the data format selected by the first selector 222 from among multiple pieces of dictionary information stored in the dictionary information storage unit 208. In contrast, for example, when the user does not make an instruction action of indicating an UI image for selecting a data format (if the first selector 222 does not make any selection), or when the image received by the server device 12 does not contain any data in a data format different from the data format of the image, the second determination unit 209 determines, as dictionary information for performing image output control, the dictionary information corresponding to the third information indicating the data format of the image received from the server device 12. The second determination unit 209 then notifies the projection controller 210 of the determined dictionary information.

In the second embodiment, when it is determined that a projection target image contains, for multiple data formats, UI images respectively for selecting the data formats and that the projection target image contains data in a data format different from the data format of the image, the first selector 222 selects the data format corresponding to the UI image indicated by the user's instruction action. Alternatively, for example, the control unit may further include an identifying unit that, when it is determined that a projection target image contains data in a data format different from that of the image, identifies a data format corresponding to the coordinates of a target object (such as a user's hand) in a projection area on the basis of data structure information where multiple data formats contained in a projection target image are associated with the coordinates of data in the data formats and the first selection unit (the first selector 222) may select a data format according to the identifying performed by the identifying unit. This modification (modification of the second embodiment) will be described below.

Figure 17:
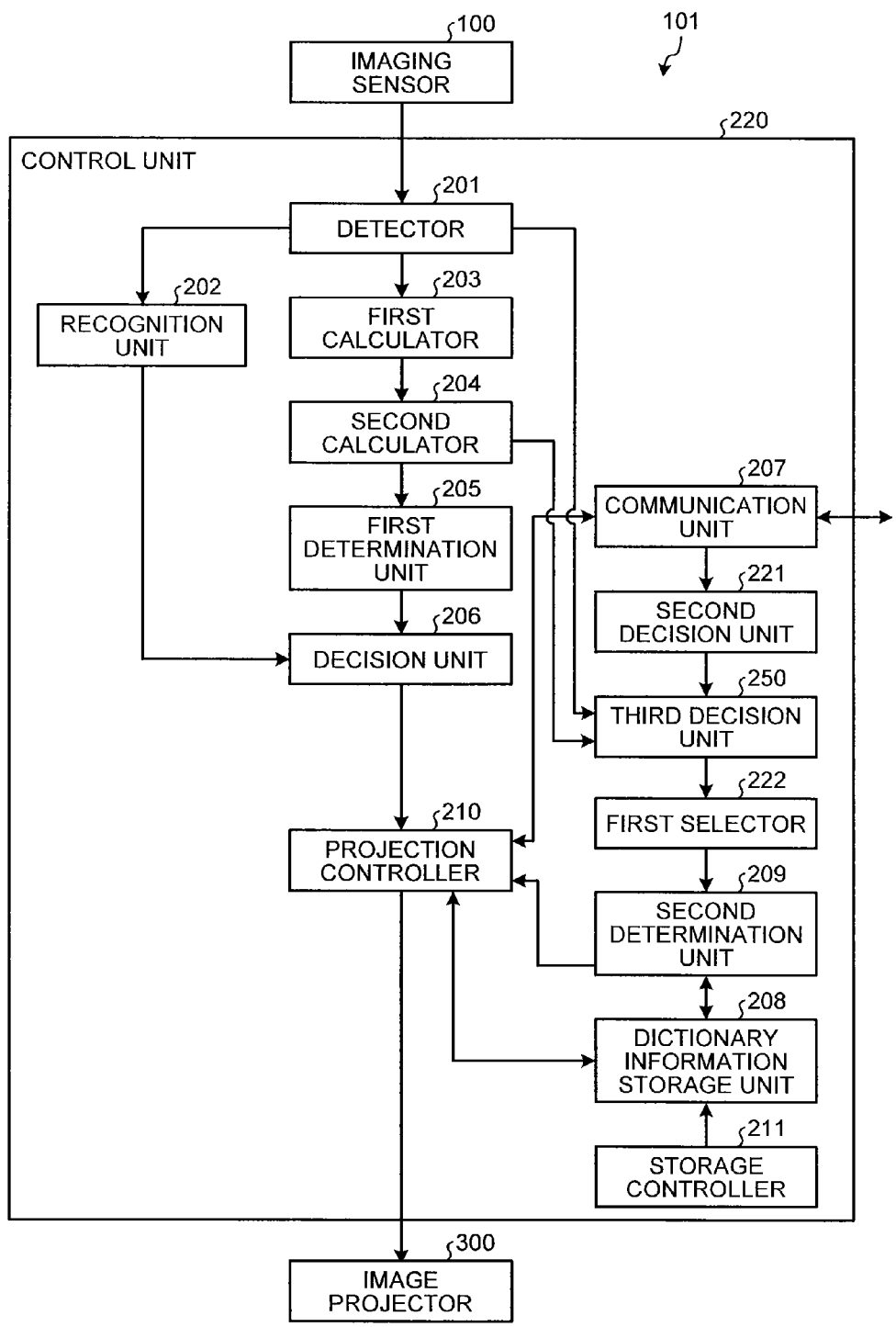
FIG. 17 is a block diagram of an exemplary functional configuration of a projector according to a modification of the second embodiment.

FIG. 17 is a block diagram of an exemplary configuration of the projector 101 according to the modification. As shown in FIG. 17, the control unit 220 has a different configuration from that shown in FIG. 16 in that the control unit 220 further includes a third decision unit 250. The third decision unit 250 may be referred to as an identifying unit. On the basis of data structure information where multiple data formats contained in a projection target image are associated with coordinates of data in the data formats, the third decision unit 250 identifies the data format corresponding to the coordinates of a target object in a projection area. The details will be given below.

In this example, when the detector 201 detects a target object on the basis of image data that is acquired from the imaging sensor 100, the third decision unit 250 calculates the coordinates of the target object in the projection area on the basis of the image data and the size of the projection area calculated by the second calculator 204. When the second decision unit 221 decides that the projection target image contains data in a data format different from the data format of the image, the third decision unit 250 reads data structure information on the projection target image from a memory (not shown) and, on the basis of the read data structure information, identifies the data format corresponding to the coordinates of the target object in the projection area. FIG. 18 is a diagram of exemplary data structure information on the projection target image according to the modification. The memory (not shown) that stores the data structure information may be provided to the projector 101 or an external device such as the server device 12.

The first selector 222 selects a data format in accordance with the identifying performed by the third decision unit 250. The second determination unit 209 then determines, as dictionary information for performing image output control, dictionary information corresponding to the third information indicating the data format selected by the first selector 222 from among multiple pieces of dictionary information stored in the dictionary information storage unit 208.

Figure 19:
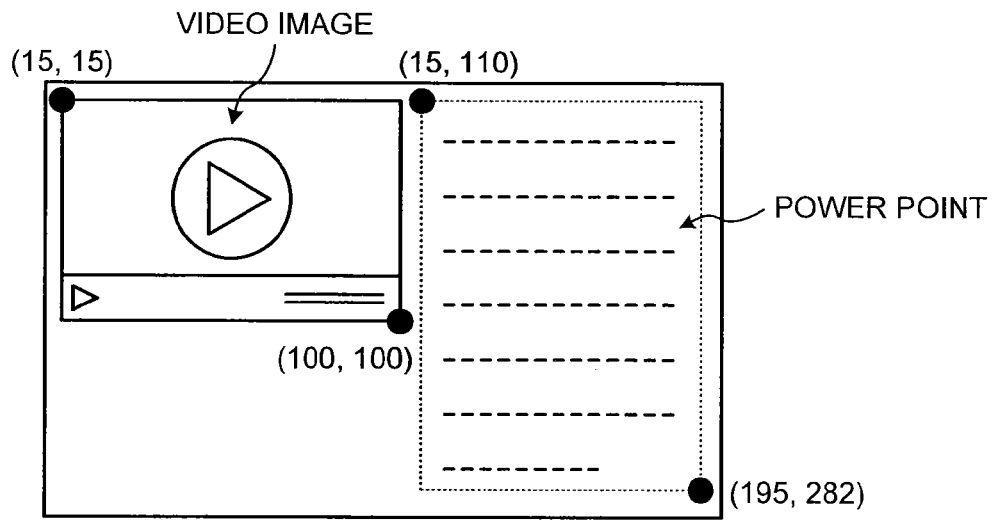
FIG. 19 is a diagram of an exemplary projection of a projection target image according to the modification.
Figure 20:
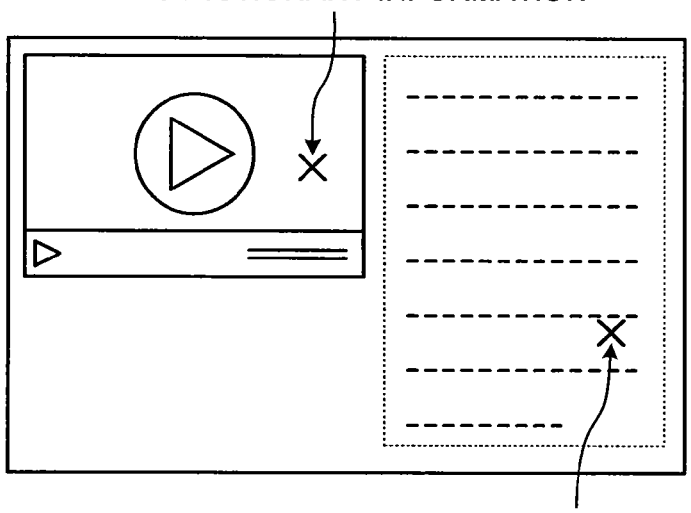
FIG. 20 is a diagram of an exemplary projection of a projection target image according to the modification.

FIGS. 19 and 20 are diagrams of exemplary projection of a projection target image according to the modification. As shown in FIG. 20, for example, when the coordinates of the target object in the projection area are within the coordinate area corresponding to "video", it is determined that the data format corresponding to the coordinates of the target object is "video" and accordingly dictionary information corresponding to "video" is selected. When, for example, the coordinates of the target object in the projection area are within the coordinate area corresponding to "PowerPoint", it is determined that the data format corresponding to the coordinates of the target object is "PowerPoint" and accordingly dictionary information corresponding to "PowerPoint" is selected.

In short, it is satisfactory if the first selector 222 has a function of selecting, when the projection target image contains data in a data format different from that of the image, any one data format on the basis of detection of the target object performed by the detector 201.

As described above, in the second embodiment, when the image data received from the server device 12 contains data in a data format different from that of the image, any one data format is selected in response to a user's input. Dictionary information corresponding to the third information indicating the selected data format is then determined as dictionary information for performing image output control. Accordingly, the user can use different pieces of dictionary information in accordance with the data contained in the image to be projected, which leads to advantageous effects in that the user's convenience improves.

Third Embodiment

A third embodiment will be described below. The method of determining dictionary information in the third embodiment is different from those of the first and second embodiments. This will be described in detail below. Common contents between the third embodiment and the first and second embodiments will be omitted as and when appropriate.

Figure 21:
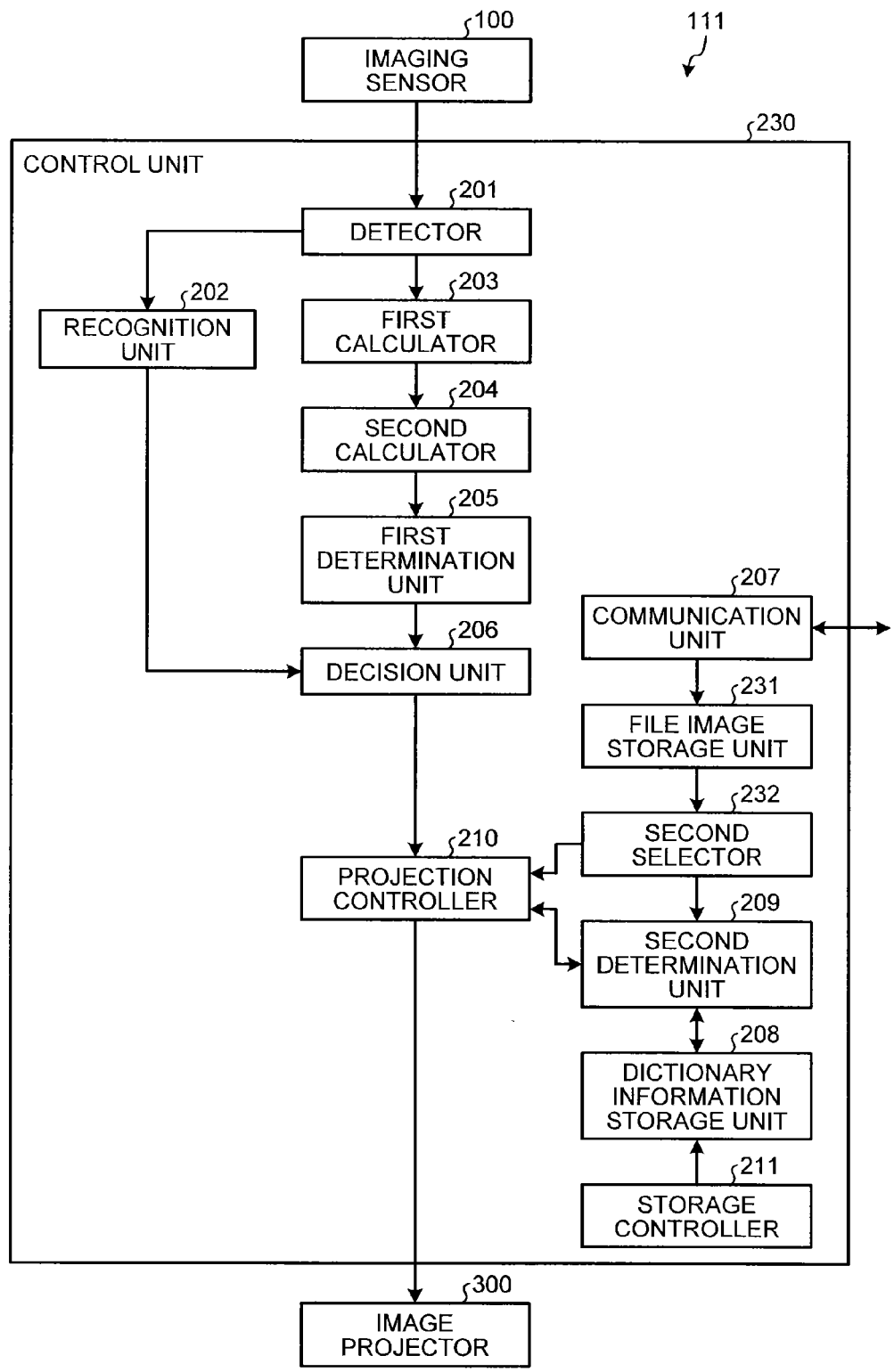
FIG. 21 is a block diagram of an exemplary functional configuration of a projector according to a third embodiment.

FIG. 21 is a block diagram of an exemplary configuration of a projector 111 according to the third embodiment. As shown in FIG. 21, the projector 111 includes the imaging sensor 100, a control unit 230, and the image projector 300. The control unit 230 has a different function from those of the control units of the first and second embodiments.

As shown in FIG. 21, the control unit 230 is different from the control unit of the first embodiment in that it further includes a file image storage unit 231 and a second selector 232. The file image storage unit 231 stores multiple file images each including multiple sets of pages each indicating the unit of data to be projected onto the projection target 2. In this example, the communication unit 207 receives (acquires) file images that are generated by the server device 12 and the file image storage unit 231 previously registers file images received by the communication unit 207.

The second selector 232 has a function of selecting, in response to a user's input, any one of the multiple file images that are stored in the file image storage unit 231. The method performed by the user to select a desired file image is arbitrary. The second selector 232 passes the selected file image to the projection controller 210 and notifies the second determination unit 209 of information indicating the result of the selection.

Each time of receiving a file image from the second selector 232, the projection controller 210 controls the projecting of the received file image onto the projection target 2. In this example, upon receiving a file image from the second selector 232, the projection controller 210 controls the projecting of the top page of the received file image onto the projection target 2. For the following pages, the projection controller 210 controls the projecting of the following pages onto the projection target 2, on the basis of an instruction action recognized by the recognition unit 202 (in this example, the instruction action indicated by the information that is output from the decision unit 206) and dictionary information determined by the second determination unit 209. In this example, the projection controller 210 has a function of notifying the second determination unit 209 of page information indicating the page that is currently projected on the projection target 2.

Figures 22, 23:
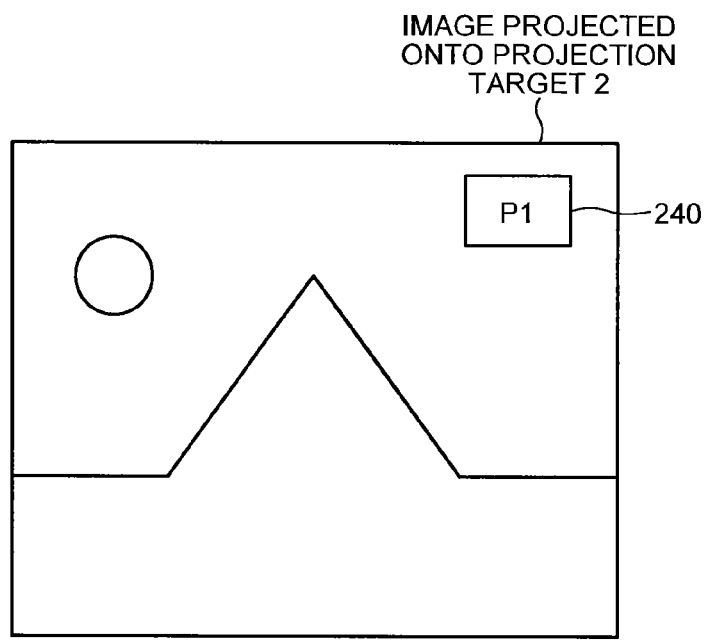
FIG. 22 is a diagram of exemplary information that is stored in a dictionary information storage unit according to the third embodiment.
FIG. 23 is a diagram describing exemplary control on notifying a user of information that can identify dictionary information that is determined by a second determination unit.

In the third embodiment, the storage controller 211 stores multiple pieces of page information each indicating a pre-specified range of at least one page in association with multiple pieces of dictionary information (information where multiple pieces of first information are associated with multiple pieces of second information, respectively). FIG. 22 is a diagram of exemplary information that is stored in the dictionary information storage unit 208 according to the third embodiment. FIG. 22 illustrates exemplary information that is tied with file images indicating "presentation files". The same can be applied to other file images.

In the example of FIG. 22, Pattern 1 dictionary information is associated with the page information indicating "first to third pages". Pattern 2 dictionary information is associated with the page information indicating "fourth page". Furthermore, Pattern 3 dictionary information is associated with the page information indicating "fifth page". As in the case of the first embodiment, for example, in the above-described document dictionary information (PowerPoint dictionary information), the Pattern 1 dictionary information, Pattern 2 dictionary information, and Pattern 3 dictionary information, second information associated with common first information is set different according to each piece of dictionary information.

The descriptions here will be continued by referring back to FIG. 21. The second determination unit 209 determines dictionary information corresponding to page information that contains a set of pages to be projected onto the projection target 2 from among the multiple pages of a file image selected by the second selector 232. In the third embodiment, on the basis of the result of the selection notified by the second selector 232 and the page information notified by the projection controller 210, the second determination unit 209 can specify which page is to be projected from among the multiple pages contained in the file image selected by the second selector 232. The second determination unit 209 then determines, as dictionary information for performing image output control, dictionary information where the file image selected by the second selector 232 is associated with the page information indicating the specified page from among the multiple pieces of dictionary information stored in the dictionary information storage unit 208. The second determination unit 209 then notifies the projection controller 210 of the determined dictionary information. On the basis of the instruction action recognized by the recognition unit 202 and the dictionary information determined by the second determination unit 209, the projection controller 210 controls the projecting of each page contained in the file image selected by the second selector 23 onto the projection target 2.

As described above, according to the third embodiment, a setting can be made such that the dictionary information is switched in accordance with the page to be projected. In other words, a user can use different pieces of dictionary information in accordance with the contents to be projected, which leads to advantageous effects in that the user's convenience improves.

Embodiments of the present invention have been described above, but they are provided as examples only and are not intended to limit the scope of the invention. The invention is not limited to the above-described embodiments and it can be embodied when carried out by modifying the components within the scope of the invention. Furthermore, various inventions can be formed by using appropriate combinations from among the components disclosed in the embodiments. For example, the components shown in the embodiments may be partly omitted.

In each of the above-described embodiments, the projection controller 210 can control the notifying of a user of information that can identify dictionary information that is determined by the second determination unit 209. For example, in the third embodiment, when the second determination unit 209 determines the "Pattern 1 dictionary information" illustrated in FIG. 22, the projection controller 210 can control the projecting and displaying of an image 240 that can identify "Pattern 1 dictionary information".

For example, each of the embodiments has been described by exemplifying a configuration where the projector 1 includes the imaging sensor 100 (configuration where the projector 1 and the imaging sensor 100 are integrated). Alternatively, the imaging sensor 100 may be provided independently from the projector 1.

For example, the function of the control unit (20, 220, or 230) may be installed in an information processing apparatus that is connected to a projector. In short, the present invention may be applied to an information processing apparatus. The information processing apparatus according to the present invention may include at last a recognition unit, a storage controller, a determination unit, and a projection controller. The recognition unit recognizes an instruction action for an image that is projected by a projection unit (e.g. the image projector 300) that projects an image onto a projection target. The storage controller stores, for each image type, correspondence information where multiple instruction actions are associated with image output control corresponding to each of the instruction actions in the storage device. On the basis of the type of the image that is projected by the projection unit, the determination unit determines correspondence information for performing image output control. On the basis of the correspondence information determined by the determination unit and the instruction operation recognized by the recognition unit, the projection controller performs image projection control corresponding to the output control associated with the instruction action.

Furthermore, the functions of the units of the projector 1 may be dispersedly installed in a projector and an information processing apparatus that is connected to the projector. In short, the present invention may be applied to a system that includes a projector and an information processing apparatus that is connected to the projector. It is satisfactory if the system according to the present invention includes a projection unit, a recognition unit, a storage controller, a determination unit, and a projection control unit. The projection unit projects an image onto the projection target. The recognition unit recognizes an instruction action for the image projected by the projection unit. The storage control unit store, for each image type, correspondence information where multiple instruction actions are associated with image output control corresponding to each of the instruction actions in a storage device. On the basis of the type of image projected by the projection unit, the determination unit determines correspondence information for performing image output control. On the basis of the correspondence information determined by the determination unit and the instruction action recognized by the recognition unit, the projection control unit performs image projection control corresponding to the output control associated with the instruction action.

The program that is executed by the projector 1 or the server device 12 may be configured to be recorded in an installable-format or executable-format file in a computer-readable storage medium such as a CD-ROM, a flexible disc (FD), a CD-R, a DVD (Digital Versatile Disk) and provided.

Furthermore, the program that is executed by the projector 1 or the server device 12 may be stored in a computer that is connected to a network, such as the Internet, and downloaded via the network so as to be provided or distributed.

According to the embodiments, it is possible to provide an image projection apparatus, a system, and an image projection method that eliminate the need for the users to remember various instruction actions.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus, comprising:
   a first determination circuit configured to determine an instruction area in which an instruction action is to be made, the instruction action corresponding to content in an image projected by a projector onto a projection target;
   a recognition circuit configured to recognize the instruction action for the image projected by the projector;
   a decision circuit configured to decide whether the instruction action is made within the instruction area;
   a detection circuit configured to detect a target object within a target space corresponding to the image projected onto the projection target;
   a first selection circuit configured to select a data format when the image projected by the projector includes pieces of data that are in different data formats from each other;
   a storage control circuit configured to store, in a storage device,
      correspondence information that associates multiple instruction actions with image output controls, respectively, for each type of image, and
      data structure information that indicates coordinate information of the data in the image data;
   a second determination circuit configured to determine correspondence information for image output control based on a type of the image projected by the projector and the data format selected by the first selection circuit; and
   a projection control circuit configured to perform, based on the correspondence information determined by the second determination circuit and the instruction action recognized by the recognition circuit, image projection control corresponding to the image output control that is associated with the instruction action, wherein
   the storage control circuit stores the correspondence information for each data format of the data in the image projected by the projector,
   the decision circuit calculates coordinates of the target object detected by the detection circuit, and
   the first selection circuit selects the data format based on the calculated coordinates and the coordinate information of data in the data structure information.

2. The image projection apparatus according to claim 1, wherein among two or more pieces of correspondence information, image output control that is associated with a common instruction action differs depending on the piece of correspondence information.

3. The image projection apparatus according to claim 1, wherein the recognition circuit is configured to recognize the instruction action based on the detection of the target object performed by the detection circuit, the image projected onto the projection target includes user interface (UI) images corresponding respectively to multiple data formats to select a data format, and the first selection circuit is configured to select the data format corresponding to the UI image that is indicated by the instruction action.

4. The image projection apparatus according to claim 1, further comprising:

an identifying circuit configured to identify a data format corresponding to coordinates of the target object in the projection area based on the data structure information, wherein the first selection circuit is configured to select the data format in accordance with the identification performed by the identifying circuit.

5. The image projection apparatus according to claim 1, further comprising:

a file image storage circuit configured to store, in the storage device, multiple file images each including multiple sets of pages that each indicate a unit of data to be projected onto the projection target; and a second selection circuit configured to select one of the file images stored in the file image storage circuit in response to a user's input, wherein the storage control circuit is configured to store, in the storage device, multiple pieces of page information each indicating a pre-specified range of at least one page and multiple pieces of correspondence information for each file image so that the multiple pieces of page information are associated with the multiple pieces of correspondence information, respectively, and the second determination circuit is configured to determine, as a piece of correspondence information that is subject to the image output control, a piece of correspondence information corresponding to a piece of page information that contains a page to be projected onto the projection target from among the multiple pages of the file image selected by the second selection circuit.

6. The image projection apparatus according to claim 1, wherein the projection control circuit is configured to control notification of a user of information for identifying the correspondence information determined by the second determination circuit.

7. The image projection apparatus according to claim 1, further comprising the projector that projects the image onto the projection target.

8. The image projection apparatus according to claim 7, wherein the image is generated by a server device, and the projector receives the image from the server device.

9. The image projection apparatus according to claim 1, wherein the first determination circuit receives the instruction area from an external device.

10. An image projection method, comprising:

determining, by control circuitry, an instruction area in which an instruction action is to be made, the instruction action corresponding to content in an image projected by a projector onto a projection target;

recognizing the instruction action for the image projected onto the projection target by the projector;

deciding, by the control circuitry, whether the instruction action is made within the instruction area;

detecting a target object within a target space corresponding to the image projected onto the projection target;

calculating coordinates of the target object;

selecting a data format when the image projected by the projector includes pieces of data that are in different data formats from each other;

storing, in a storage device, correspondence information that associates multiple instruction actions with image output controls, respectively, for each type of image;

storing, in the storage device, data structure information that indicates coordinate information of the data in the image data;

determining correspondence information for image output control based on a type of the image projected by the projector and the selected data format;

storing the correspondence information for each data format of the data in the image projected by the projector; and performing, based on the correspondence information and the instruction action, image projection control corresponding to the image output control that is associated with the instruction action, wherein the data format is selected based on the calculated coordinates and the coordinate information of data in the data structure information.

11. The image projection method according to claim 10, wherein among two or more pieces of correspondence information, image output control that is associated with a common instruction action differs depending on the piece of correspondence information.

12. The image projection method according to claim 10, wherein the recognizing includes recognizing the instruction action based on the detection of the target object performed by the detection circuit, the image projected onto the projection target includes user interface (UI) images corresponding respectively to multiple data formats to select a data format, and the selecting includes selecting the data format corresponding to the UI image that is indicated by the instruction action.

13. The image projection method according to claim 10, further comprising:

identifying the data format corresponding to coordinates of the target object in the projection area based on the data structure information, wherein the selecting includes selecting a data format in accordance with the identification performed by the identifying circuit.

14. The image projection method according to claim 10, further comprising:

storing, in the storage device, multiple file images each including multiple sets of pages that each indicate a unit of data to be projected onto the projection target;

selecting one of the file images stored in the file image storage circuit in response to a user's input;

storing, in the storage device, multiple pieces of page information each indicating a pre-specified range of at least one page and multiple pieces of correspondence information for each file image so that the multiple pieces of page information are associated with the multiple pieces of correspondence information, respectively; and determining, as a piece of correspondence information that is subject to the image output control, a piece of correspondence information corresponding to a piece of page information that contains a page to be projected onto the projection target from among the multiple pages of the selected file image.

15. The image projection method according to claim 10, further comprising projecting, by the projector, the image onto the projection target.

16. The image projection method according to claim 15, wherein
the image is generated by a server device, and
the projector receives the image from the server device.

17. The image projection method according to claim 10, further comprising receiving the instruction area from an external device.

18. A projection apparatus, comprising:
a communication circuit configured to receive an image from a control device;
a projector configured to project the image onto a projection target; and
a sensor configured to detect a target object within an instruction area corresponding to the image projected onto the projection target, wherein
the communication circuit is further configured to transmit a detection signal indicating whether the target object was detected within a target space, and
the control device is configured to
determine the instruction area,
transmit an instruction area signal to the communication circuit, calculate coordinates of the target object,
select a data format when the image projected by the projector includes pieces of data that are in different data formats from each other,
store correspondence information that associates multiple instruction actions with image output controls, respectively, for each type of image, and data structure information that indicates coordinate information of the data in the image data,
determine correspondence information for image output control based on a type of the image projected by the projector and the selected data format, and
analyze the detection signal to determine whether an instruction action, by the target object, was made within the instruction area, wherein
the control device stores the correspondence information for each data format of the data in the image projected by the projector, and
the control device selects the data format based on the calculated coordinates and the coordinated information of data in the data structure information.

* * * * *